A. S. SMITH.
MOLDING BASE CANOPY SEAT.
APPLICATION FILED MAY 1, 1916.
1,224,576. Patented May 1, 1917.
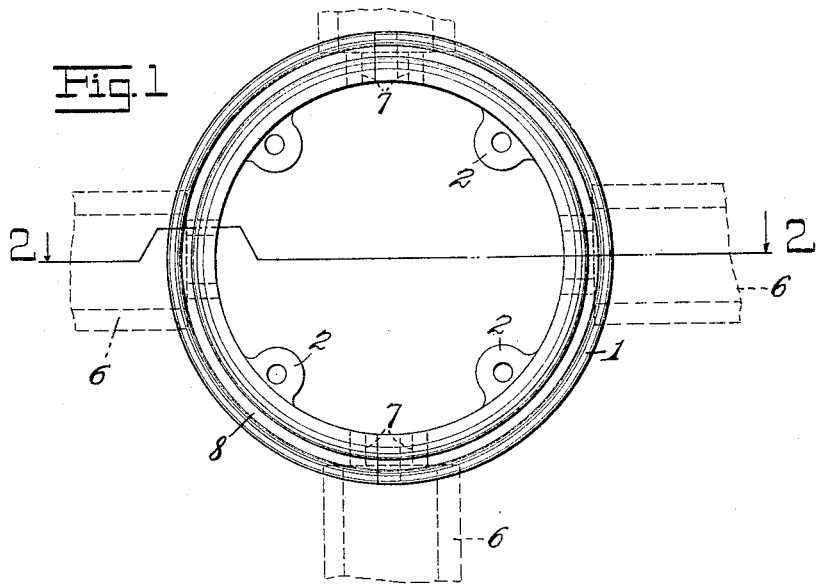
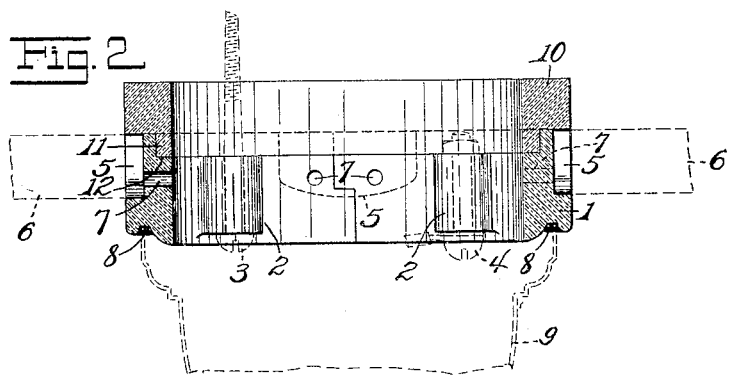
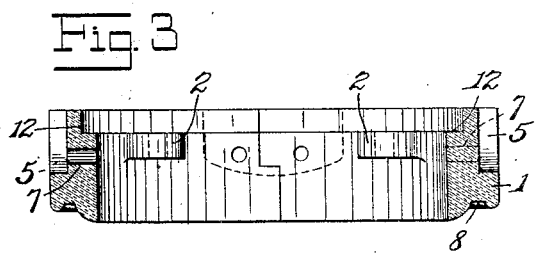
INVENTOR
Allison S. Smith
BY
ATTORNEY

UNITED STATES PATENT OFFICE.

ALLISON S. SMITH, OF BELLAIRE, OHIO.

MOLDING-BASE CANOPY-SEAT.

1,224,576.  Specification of Letters Patent.  Patented May 1, 1917.

Application filed May 1, 1916. Serial No. 94,542.

*To all whom it may concern:*

Be it known that I, ALLISON S. SMITH, a citizen of the United States of America, and resident of Bellaire, county of Belmont, and State of Ohio, have invented certain new and useful Improvements in Molding-Base Canopy-Seats, of which the following is a specification.

This invention relates specifically to seats for the canopies of electric light fixtures, and it has for its primary object to provide a canopy seat of molding-base type, adapted for mounting upon a ceiling or wall, which is designed to receive the ends of wire-inclosing moldings and which constitutes a mounting whereon the usual canopy fitting seats and by which said fitting is elevated to an out-of-the-way position with respect to the molding.

Hitherto, when wire-inclosing moldings have been mounted upon walls and ceilings, it has been necessary to cut away or notch out a portion or portions of the inner edge of the usual sheet-metal canopy fitting to which or from which the molding or moldings lead in order that the ends of the latter may be received within its embrace. This not only consumes considerable time, but also results in defacement of the fitting.

It is therefore the chief object of my invention, as above indicated, to provide a base for such canopies by means of which the objection above noted will be obviated.

With this and other objects in view, the invention resides in the features of construction which will hereinafter be fully described, reference being had to the accompanying drawings, in which—

Figure 1 is a plan view of the invention;

Fig. 2 is a section on the line 2—2, Fig. 1; and—

Fig. 3 is a similar section illustrating a slightly modified form of the invention.

Referring to said drawings, in which like designating characters distinguish like parts throughout the several views—

1 indicates a ring composed of a suitable material which is a non-conductor of electric current, as porcelain, fiber, or the like. While said ring is herein shown as composed of two semi-circular sections having interengaging ends, it will be understood that the same may be of other preferred shape, as square or hexagonal, and may be formed in one piece instead of two. Formed interiorly of the ring is a plurality of apertured ears or lugs 2 through which securing screws 3 may be directed for attaching the ring to a wall or ceiling. Certain of said lugs 2 may, if desired, serve as a mounting for wire terminals, being adapted for receiving terminal posts or screws 4 as well as attaching screws. Said lugs may be of any suitable thickness, as indicated in the drawings wherein Fig. 2 depicts them of a thickness approximating that of the ring, while Fig. 3 depicts them as being of relatively less thickness.

Formed in the periphery of the ring is one or more recesses or sockets 5 designed for the reception of the ends of wire-inclosing moldings 6, the number of said recesses preferably corresponding with the number of moldings which are to be disposed in radial relation thereto. Leading radially through the ring from the inner ends of the recesses are holes 7 through which the ends of the wires carried by the moldings are to be directed.

Formed in the outer face of the ring is an annular groove or channel 8 which constitutes a seat for the reception of the canopy 9 which forms a usual part of the various common forms of lighting fixtures.

The ring 1 is primarily designed for seating directly upon a plastered surface; however, in order to adapt the same for mounting on ceilings or walls prior to plastering, a base member 10 may be employed, as shown in Fig. 2, said member preferably having a form and diameter substantially corresponding to that of the ring 1 which is to seat thereon. Said base member is formed with an outwardly directed circular rim 11 adapted to be snugly received within an internal annular recess 12 provided in the inner edge or face of said ring. Said base member may be composed of any suitable material and has a thickness which substantially corresponds to that of the plaster commonly applied to walls and ceilings. Thus, when a molding is seated on the plastered surface, the end thereof which is received within the recesses 5 will seat upon the exposed face of the base.

What is claimed is—

1. A canopy seat comprising a ring of non-conductive material having radially disposed sockets in its periphery for receiving the ends of wire-inclosing moldings and having wire-receiving holes leading from said sockets to the interior thereof, said ring also having a channel in its outer face for the reception of the larger end of a canopy fitting, said ring also having an internal annular recess in its inner face, and a base member for said ring conforming in diameter to the latter and having a rim adapted to be received within said recess, and attaching lugs carried by said ring.

2. A canopy seat comprising a ring of non-conductive material having radially disposed sockets in its periphery for receiving the ends of wire-inclosing moldings and having wire-receiving holes leading from said sockets to the interior thereof, said ring also having a channel in its outer face for the reception of the larger end of a canopy fitting, said ring also having an internal annular recess in its inner face, and a base member for said ring conforming in diameter to the latter and adapted to be encircled by the plaster of a wall or ceiling, said member having a projecting rim on its outer face adapted to be embraced by said ring and seated within said recess, and internal apertured ears carried by said ring, said ears being designed for use either as attaching lugs or as terminal mountings.

In testimony whereof, I affix my signature in presence of two subscribing witnesses.

ALLISON S. SMITH.

Witnesses:
H. E. DUNLAP,
W. F. KEEFER.

Copies of this patent may be obtained for five cents each, by addressing the "Commissioner of Patents, Washington, D. C."